Patented Sept. 8, 1925.

1,553,002

UNITED STATES PATENT OFFICE.

CHARLES O. NELSON, OF GREELEY, NEBRASKA, ASSIGNOR OF THREE-FOURTHS TO JOHN F. McDERMOTT AND THOMAS W. LANIGAN, BOTH OF GREELEY, NEBRASKA, AND ARTHUR F. MULLEN, OF OMAHA, NEBRASKA.

LIVESTOCK REMEDY.

No Drawing.   Application filed December 16, 1924.   Serial No. 756,337.

*To all whom it may concern:*

Be it known that CHARLES O. NELSON, a citizen of the United States, residing at Greeley, in the county of Greeley and State of Nebraska, has invented certain new and useful Improvements in Livestock Remedies, of which the following is a specification.

The invention relates to live stock remedies and has for its object to provide a combination of chemicals, which when fed to live stock exudes a disagreeable odor through the skin of the animal so obnoxious to flies, insects and the like, that they will not light on the animal, however if they do light on the animal they will not remain there.

The chemical compound comprises a mixture of salt, sulphur and calcium, and it has been found to give the best results by mixing eighty per cent salt, fifteen per cent sulphur and five per cent lime. Where the compound is fed to cattle, horses and other live stock, it has been found that they are entirely free from flies, lice and other insects. The medicine is fed to the live stock internally and it afterwards exudes in the sweat of the animal and lodges on the hair and creates a condition which protects the animal from insects. It has also been found that it has secondary advantages, as it acts as a laxative, supplies necessary lime and takes the place of other salt.

From the above it will be seen that an internal chemical compound is provided for use in connection with live stock which will keep the same free of flies and that the ingredients are of a nature which will not be detrimental to the live stock and are of a character which are cheap and easily obtained.

The present practice of freeing cattle and animals of lice and repelling flies is to dip the animals, which is an extremely expensive process, involving a great deal of labor and where large herds are involved the cost is prohibitive as the process has to be repeated every few days, as the dipping materials soon washes from the animals incident to perspiration and only lasts a few days. By feeding the compound to the animal the system becomes saturated therewith and is given off through the pores of the skin constantly, therefore it will be seen that the expensive dipping operation is obviated, and the perspiration will not wash the medicine from the skin and hair of the animals as it is constantly exuded through the pores of the skin, as long as the material is mixed with the food of the animal. It has also been found where used in connection with milk cows, the milk is not affected.

The invention having been set forth what is claimed as new and useful is:—

1. A chemical compound used internally for live stock, said compound comprising a mixture of salt, sulphur and lime.

2. A chemical compound used internally by live stock for preventing insects from staying on the body of the live stock, said compound consisting of a mixture of eighty per cent salt; fifteen per cent sulphur and five per cent lime.

3. A chemical compound used internally for live stock, said compound consisting of a mixture of sulphur, lime, and a body ingredient pleasing to the taste of an animal.

In testimony whereof I hereunto affix my signature.

CHARLES O. NELSON.